United States Patent
Pesarese (10) Patent No.: US 10,558,345 B2
(45) Date of Patent: Feb. 11, 2020

(54) USER INTERFACE DEVELOPMENT IN A TRANSCOMPILING ENVIRONMENT

(71) Applicant: SAP SE, Walldorf (DE)

(72) Inventor: Marco Pesarese, Nussloch (DE)

(73) Assignee: SAP SE, Walldorf (DE)

( * ) Notice: Subject to any disclaimer, the term of this patent is extended or adjusted under 35 U.S.C. 154(b) by 611 days.

(21) Appl. No.: 14/941,762

(22) Filed: Nov. 16, 2015

(65) Prior Publication Data
US 2017/0139577 A1   May 18, 2017

(51) Int. Cl.
*G06F 3/0484* (2013.01)
*G06F 8/38* (2018.01)
*G06F 3/0481* (2013.01)
*G06F 8/76* (2018.01)

(52) U.S. Cl.
CPC ............ *G06F 3/04847* (2013.01); *G06F 8/38* (2013.01); *G06F 3/04817* (2013.01); *G06F 8/76* (2013.01)

(58) Field of Classification Search
CPC .. G06D 3/04817; G06D 8/76; G06F 3/04817; G06F 8/76
See application file for complete search history.

(56) References Cited

U.S. PATENT DOCUMENTS

| | | | |
|---|---|---|---|
| 5,867,153 A * | 2/1999 | Grandcolas | G06Q 20/04 705/39 |
| 6,023,714 A * | 2/2000 | Hill | G06F 17/211 715/235 |
| 7,765,539 B1 * | 7/2010 | Elliott | G06F 8/53 717/145 |
| 2003/0063120 A1 * | 4/2003 | Wong | G06F 9/451 715/746 |
| 2004/0046789 A1 * | 3/2004 | Inanoria | G06F 8/38 715/748 |
| 2005/0091576 A1 * | 4/2005 | Relyea | G06F 9/451 715/211 |
| 2005/0257157 A1 * | 11/2005 | Gilboa | G06F 8/38 715/747 |
| 2006/0036745 A1 * | 2/2006 | Stienhans | G06F 8/38 709/228 |
| 2006/0101404 A1 * | 5/2006 | Popp | G06F 11/3688 717/124 |
| 2006/0206861 A1 * | 9/2006 | Shenfield | G06F 8/35 717/106 |

(Continued)

OTHER PUBLICATIONS

"Factory (object-oriented programming)," retrieved on Apr. 16, 2018, from https://en.wikipedia.org/wiki/Factory_(object-oriented_programming), archived on Oct. 21, 2014, by the Internet Archive. 8 pages.*

(Continued)

*Primary Examiner* — Eric J. Bycer
(74) *Attorney, Agent, or Firm* — Klarquist Sparkman, LLP (57) ABSTRACT

Described herein is a framework for facilitating user interface development. In accordance with one aspect, a trigger for creating a native user interface element for a target platform based on a user interface context is received from a client system. The native user interface element may be instantiated and initialized, along with an associated native control. The user interface context with the native user interface element may then be returned to the client system.

16 Claims, 3 Drawing Sheets

(56) References Cited

U.S. PATENT DOCUMENTS

| | | | | |
|---|---|---|---|---|
| 2008/0092057 | A1* | 4/2008 | Monson | G06F 9/451 715/744 |
| 2009/0077091 | A1* | 3/2009 | Khen | G06F 8/20 |
| 2009/0083724 | A1* | 3/2009 | Eichenberger | G06F 8/447 717/160 |
| 2010/0017812 | A1* | 1/2010 | Nigam | G06F 8/20 719/328 |
| 2010/0131922 | A1* | 5/2010 | Shenfield | G06F 8/20 717/107 |
| 2011/0154287 | A1* | 6/2011 | Mukkamala | G06F 8/20 717/105 |
| 2013/0219307 | A1* | 8/2013 | Raber | G06F 3/0484 715/763 |
| 2014/0026086 | A1* | 1/2014 | Zuverink | G06F 9/451 715/765 |
| 2014/0365869 | A1* | 12/2014 | Warila | G06F 8/24 715/234 |
| 2015/0067664 | A1* | 3/2015 | Ligman | G06F 9/452 717/168 |

OTHER PUBLICATIONS

"Declaring, Instantiating and Initializing an Object" retrieved on Apr. 16, 2018, from https://www.cs.princeton.edu/courses/archive/spr96/cs333/java/anatomy/creating.html, archived on Feb. 12, 2015, by the Internet Archive. 2 pages.*

"The JAVA Tutorials: Classes and Objects" retrieved on Apr. 16, 2018, from https://docs.oracle.com/javase/tutorial/java/javaOO/objectioncreation.html, archived on Nov. 5, 2014, by the Internet Archive. 3 pages.*

"Factory Method Pattern" retrieved on Apr. 16, 2018, from https://best-practice-software-engineering.ifs.tuwien.ac.at/patters/factory.html, archived on Oct. 31, 2014, by the Internet Archive. 4 pages.*

Cooper, James W., "The Design Patterns Companion JAVA Companion," Addison-Wesley, 1998. 218 pages (specifically, see pp. 18-30 and 54-79). (Year: 1998).*

Cohen et al., "Better Construction with Factories," Journal of Object Technology, vol. 6, No. 6 (Jul.-Aug. 2007). pp. 109-129. (Year : 2007).*

* cited by examiner

USER INTERFACE DEVELOPMENT IN A TRANSCOMPILING ENVIRONMENT

TECHNICAL FIELD

The present disclosure relates generally to computer systems, and more specifically, to user interface development in a transcompiling environment.

BACKGROUND

A transcompiling environment provides the ability to write software code once in a source (or master) language and reuse the code on multiple different target software platforms. A perfect adaption to the native platform is crucial, especially for graphical user interfaces, the acceptance of which depends on a smooth integration of the standard look and feel of the platform.

To build full end-to-end applications with a graphical user interface (GUI), a library is needed to support native GUIs on different platforms. There are a number of portable GUI libraries currently available, such as Standard Widget Toolkit (SWT), SWING and QT. However, none of these libraries work in a transcompilable environment with different target languages. Presently, no good solution exists for most known environments, and hence quality problems are common.

SUMMARY

A framework for facilitating user interface development is described herein. In accordance with one aspect, a trigger for creating a native user interface element for a target platform based on a user interface context is received from a client system. The native user interface element may be instantiated and initialized, along with an associated native control. The user interface context with the native user interface element may then be returned to the client system.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

A framework for developing graphical user interfaces in a transcompiling environment is described herein. In accordance with some implementations, all user interface (UI) elements are associated with the same group of a UI context. Rather than using different interfaces for different UI elements, the application developer always sees and uses the same UI context with no specialization. An instance of a new UI context may be indirectly created by using a factory in the form of a UI type constant.

The present framework provides a universal and robust architecture for developing UI related application layers in a transcompiling environment. The single architecture combines specific patterns to abstract from the underlying native UI layer. One aspect of the framework provides a remote terminal to run and debug the application in the master (or source) language while using the target UI language. The remote terminal approach may work for all target platform types. Tracing and replay are integrated to allow regression tests on application scenarios. Such tracing feature can be very valuable in professional software development.

Another aspect of the framework performs manipulations and access of the UI elements in a query-like manner, where multiple and probably different UI elements may be collected, and similar properties may be changed within a single statement. The framework provides a UI programming paradigm for UI platforms that do not support it directly, as they rely on different classes per UI control. The framework is extensible in a way that non-native elements (i.e., composites) may be embedded in native elements. The UI elements may be dynamically replaced in a style-like manner at a central spot without changing the application code. These and other features and advantages will be described in more details herein.

It should be appreciated that the framework described herein may be implemented as a method, a computer-controlled apparatus, a computer process, a computing system, or as an article of manufacture such as a non-transitory computer-usable medium. These and various other features will be apparent from the following description. It should be further appreciated that the terms "client", "developer" and "user" may be used interchangeably as appropriate without departing from the scope of this disclosure.

Figure 1:
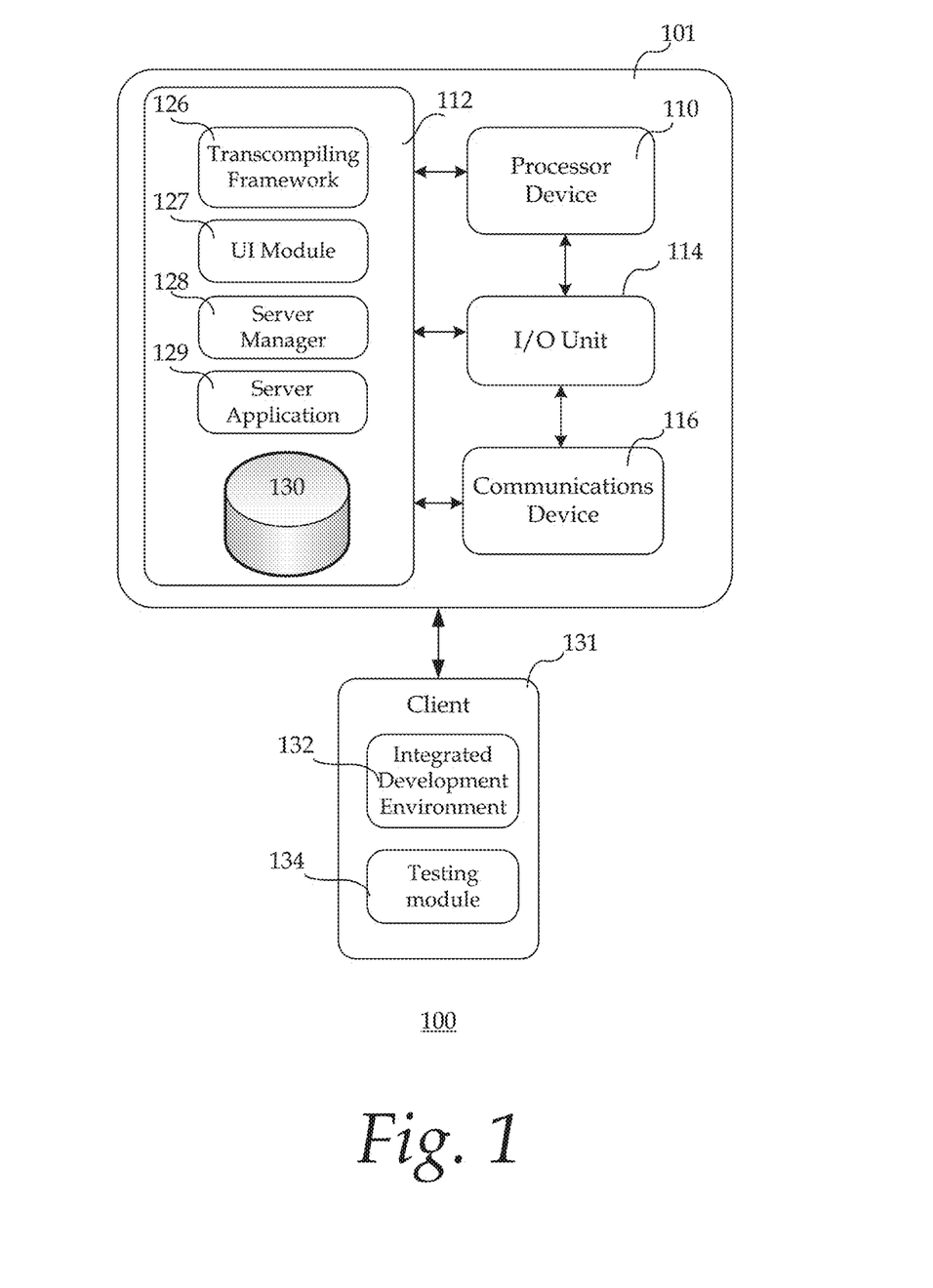
FIG. 1 is a block diagram illustrating an exemplary architecture.

FIG. 1 is a block diagram illustrating an exemplary architecture 100 in accordance with one aspect of the present framework. The architecture 100 includes a server 101 communicatively coupled to a client system 131. For illustration purposes, only one client system 131 is shown. However, it should be appreciated that multiple client systems 131 may be communicatively coupled to the server 101 using a client-server architecture. Alternatively, server 101 and client system 131 may reside in the same machine.

Server 101 can be any type of computer device capable of responding to and executing instructions in a defined manner, such as a workstation, a server, a portable laptop computer, another portable device, a mini-computer, a mainframe computer, a storage system, a dedicated digital appliance, a device, a component, other equipment, or some combination of these. Server 101 may include a processor device 110, an input/output (I/O) unit 114, a memory module 112 and a communications (or interface) device 116 (e.g., modem and/or network adapter) for exchanging data with a network (e.g., local area network (LAN), wide area network (WAN), Internet, etc.). It should be appreciated that the different components and sub-components of the server 101 may be located or executed on different machines or systems. For example, a component may be executed on many computer systems connected via the network at the same time (i.e., cloud computing).

Memory module 112 of the computer system 100 may be any form of non-transitory computer-readable media, including, but not limited to, dynamic random access memory (DRAM), static random access memory (SRAM), Erasable Programmable Read-Only Memory (EPROM), Electrically Erasable Programmable Read-Only Memory (EEPROM), flash memory devices, magnetic disks, internal hard disks, removable disks, magneto-optical disks, Compact Disc Read-Only Memory (CD-ROM), any other volatile or non-volatile memory, or a combination thereof. Memory module 112 serves to store machine-executable instructions, data, and various software components for implementing the techniques described herein, all of which may be processed by processor device 110. As such, server 101 is a general-purpose computer system that becomes a specific-purpose computer system when executing the machine-executable instructions. Alternatively, the various techniques described herein may be implemented as part of a software product. Each computer program may be implemented in a high-level procedural or object-oriented programming language (e.g., C, C++, JAVA, JAVASCRIPT, Advanced Business Application Programming (ABAP™) from SAP® SE, Structured Query Language (SQL), etc.), or in assembly or machine language if desired. The language may be a compiled or interpreted language. The machine-executable instructions are not intended to be limited to any particular programming language and implementation thereof. It will be appreciated that a variety of programming languages and coding thereof may be used to implement the teachings of the disclosure contained herein.

In some implementations, memory module 112 of server 101 includes one or more components for implementing the techniques described herein, such as transcompiling framework 126, UI module 127, server manager 128, server application 129 and database 130. It should be appreciated that some or all of these exemplary components may also be implemented in another computer system (e.g., user or client device).

The transcompiling framework 126 is responsible for controlling the overall transcompilation process for a computer program. In some implementations, the transcompiling framework 126 converts source code written in a source language into target source code in one or more target languages. The UI module 127 is responsible for transcompiling the UI-specific elements of the computer program. The UI module 127 may bind the UI controls in the same way that low-level I/O drivers are embedded. Server manager 128 manages the data communication between the server application 129 and the client system 131.

The one or more client systems 131 may interact with the server 101 in order to request services from the transcompiling framework 126 and the UI module 127. Client system 131 may include components (not shown) similar to the server 101, such as a processor device, an I/O unit, a communications device and a memory module. Client system 131 may be any type of computer device capable of responding to and executing computer readable instructions in a defined manner, such as a workstation, a server, a portable laptop computer, another portable device, a mini-computer, a mainframe computer, a storage system, a dedicated digital appliance, a device, a component, other equipment, or some combination of these.

In addition, client system 131 may include an integrated development environment (IDE) 132 that allows a developer to work on a software project that includes UI elements or application layer. The IDE 132 may include features for examining the contents of a project, including browsing the files in a project or browsing a class hierarchy in the project. The IDE 132 may also include an error display for showing transcompiling errors in the project. The IDE 132 may further include a source code editor that allows the user to edit source files including user interface elements, as well as to select the source platform and one or more target platforms or programming languages. Client system 131 may further include a testing module 134 that initiates testing of the software project, such as tracing and replaying an application scenario.

Figure 2:
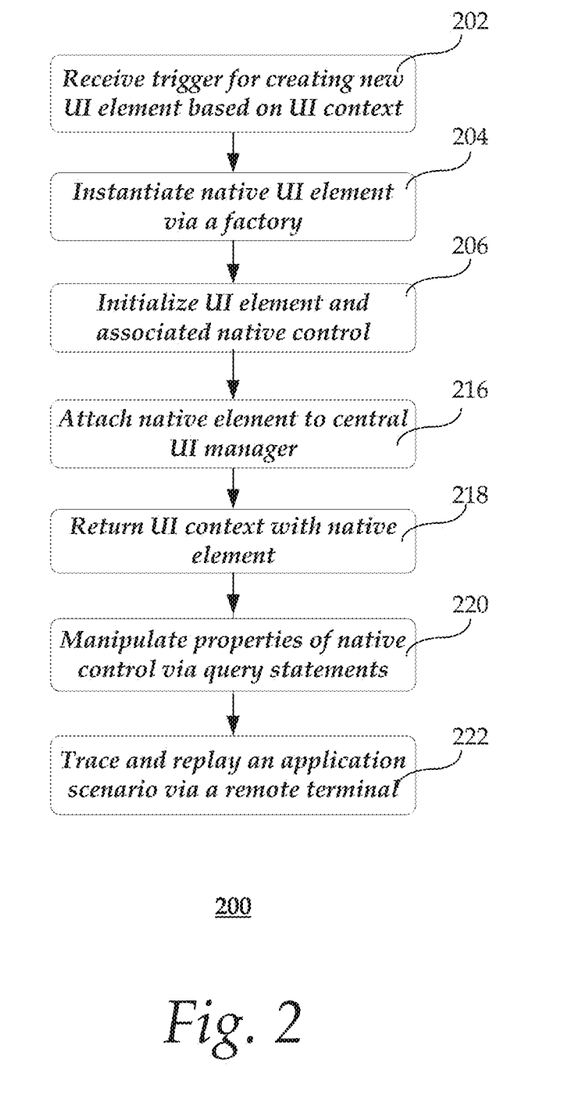
FIG. 2 illustrates exemplary steps performed at a server.

FIG. 2 illustrates exemplary steps performed at the server 101. It should be noted that in the following discussion, reference will be made, using like numerals, to the features described in FIG. 1.

At 202, UI module 127 is triggered by the IDE 132 in the client system 131 to create a new UI element for a target platform based on a UI context. The term "UI context" generally refers to an abstract class (or class instance or object) that provides a set of properties that define the environment for UI elements. The UI context serves as an interface to provide access to UI-specific classes, methods and resources. The UI context may aggregate all possible properties of the environment and parent/child manipulations for all types of UI elements. All UI elements are registered inside the UI manager and can be accessed via query statements from within the UI context.

Each UI element is a class that defines how a component of a graphical user interface visually appears, how it behaves, and how it interacts with code or data objects. Exemplary UI components include, but are not limited to, a menu, menu item, toolbar, button, bitmap, and so forth. In some implementations, the creation of a new UI element is triggered by using the UI context as a starting point. For example, the functions "context.addDefaultChild( )" and "menuItem.addDefaultChild( )" add a sub-menu. The creation may also be triggered via a type constant attribute and passing in the UI context as a parameter. For example, a button may be created using the expression "UiType.BUTTON.create(context, parameters . . . )". The type constant attribute (e.g., UiType) represents a specific common UI component, such as a button or menu.

At 204, UI module 127 instantiates a UI element native to a target platform via a factory. A "factory" generally refers to an object for creating other objects. Using factories for object creation provides encapsulation, and enables the transcompilable code to be separated (i.e., not tied to) specific native classes or objects. In some implementations, layer 0 is the factory definition, layer 1 is the factory implementation and layer 2 is the application referencing only layer 0. The native implementation for each UI element may be implemented in the UI context and registered at startup in the UI type constant as a factory. The type constant is transcompilable, but its implementation and factory registration is purely native.

UI module 127 finds the appropriate native UI element in a factory contained in a UI type constant, and instantiates the factory to generate a native UI element object for a target platform. This factory may be used only internally, and not directly by the application. In some implementations, the factory has a method to create a new UI context instance with the following exemplary signature:

IUiContext newManagedInstance(IUiManager uiManager, IUiContext parent, String identifier, UiPosition position, int firstIndex, int secondIndex, IXJson initParameters)

At 206, UI module 127 initializes the native UI element and its associated native control. The initialization step is typically very different for different native target platforms. Universal creation is advantageously enabled by using an indirection that provides full control of the processing steps and access of the environment. Depending on the target platform, the UI element may be initialized before or after native control initialization.

In some implementations, one or more of the following steps may be performed within the UI context instance: 1) create the inactive native control; 2) apply the identifier to the UI element; 3) apply the parameters to the UI element before native control initialization; 4) attach the child UI element to the parent UI element before native control initialization; 5) initialize the native control; 6) set and apply the parameters to the UI element after native control initialization; 7) attach the child UI element to the parent UI element after native control initialization; and 8) attach the new UI element to the central UI manager to be found with a query selection statement. The reason for this generic order is due to the different platforms: the code is transcompilable and the initialization order needs to work for different paradigms.

Depending on the native target platform, the native control may be initialized by different methods. For example, the initialization may be performed by using 'nativeButton=new Button( )' in the overridden initialization method. The initialization may also require passing in parameters (e.g., parent, id, position, flags, etc.): nativeButton=new Button(parent, id, styleFlags).

In some implementations, the factory is used to execute a number of steps to initialize or boot up the UI element. The initialization steps include applying a unique identifier (Id) and setting parameters of the native UI element, and attaching the native UI element to its parent element. A unique identifier is provided for each UI element to facilitate communication between the server 101 and the client system 131. Neither client system 131 nor server 101 has to use the identifier in the native or application binding context, but it may be used to improve debugging.

In some implementations, central styling is implemented to provide default values of the parameters of the native UI element. Since type factories are used, they can be dynamically replaced. Depending on the target platform, different styles can be dynamically applied. For example, a dropdown box may be converted into a combo-box by using a flag. If the style changes, the result can be replaced since the controls are created indirectly via the type factory. Default factories for a UI element (e.g., button) and multiple additional factories for a specific UI element (e.g., button that is normal, fancy, desktop, mobile, accessible, etc.) may be set via, for instance, a stylesheet configuration file, to different factories. A button may be created. A configuration file may be used to map a normal button to an experimental three-dimensional button. For a parent-child control pair, the parent factory may be pre-set with knowledge about the default child type. As child factories are often created in such a UI context by adding the default child factory, changing the default child type may be another option for central styling. In some implementations, some UI elements require a specific child type. In such cases, both the parent and the child need to be replaced to prevent the UI from failing.

In other implementations, default parameters of a control in the UI element may be changed. In the native implementation, different parameters are set as default during control initialization. This can be the desired behavior in, for example, MICROSOFT WINDOWS or APPLE MACOS. The parameters of all controls matching a given selection criterion may be changed when a UI element is created or even during runtime. The selection criterion may be, for example, "select all controls that start with the name 'input*' and have empty value, then change the background color to red." As controls are created via a factory in this approach, multiple steps may be executed for the control booting, including setting the multiple parameters. As parameters are manipulated similarly for different kinds of controls, this approach is similar to the query manipulation method described herein. After a parameter is set, it must be gracefully ignored if it is not available at the target platform. Only a subset of features is implemented in some cases, and the application continues to work normally even if not every setting can be applied.

Target implementations should not throw an unsupported operation exception when the functionality is not available. In other implementations, no exception may be implemented or a flag may be added for each method to indicate that the capability should be supported. As UI contexts normally return themselves to support chaining, the result set can always return itself. Even if an operation failed it should return itself so the process flow can continue.

The initialization steps may further include attaching the native UI element to its parent object in a UI tree. A UI tree is a hierarchical data structure of existing UI elements managed by the central UI manager. Each target platform may be associated with its own UI tree. The native implementations need to access the parent and children on the native level to enable correct embedding on the target platform. When a custom composite is created, this would lead to an error, as these composites are not part of the original low-level implementation. Instead, they combine several elements together. The problem may be solved by implementing the native drivers in a way that they always have to ask a UI context child or parent for a native instance. A native element will simply return itself, while a composite has to return its inner root element. As this works recursively, the native element will always be found.

Figure 3:
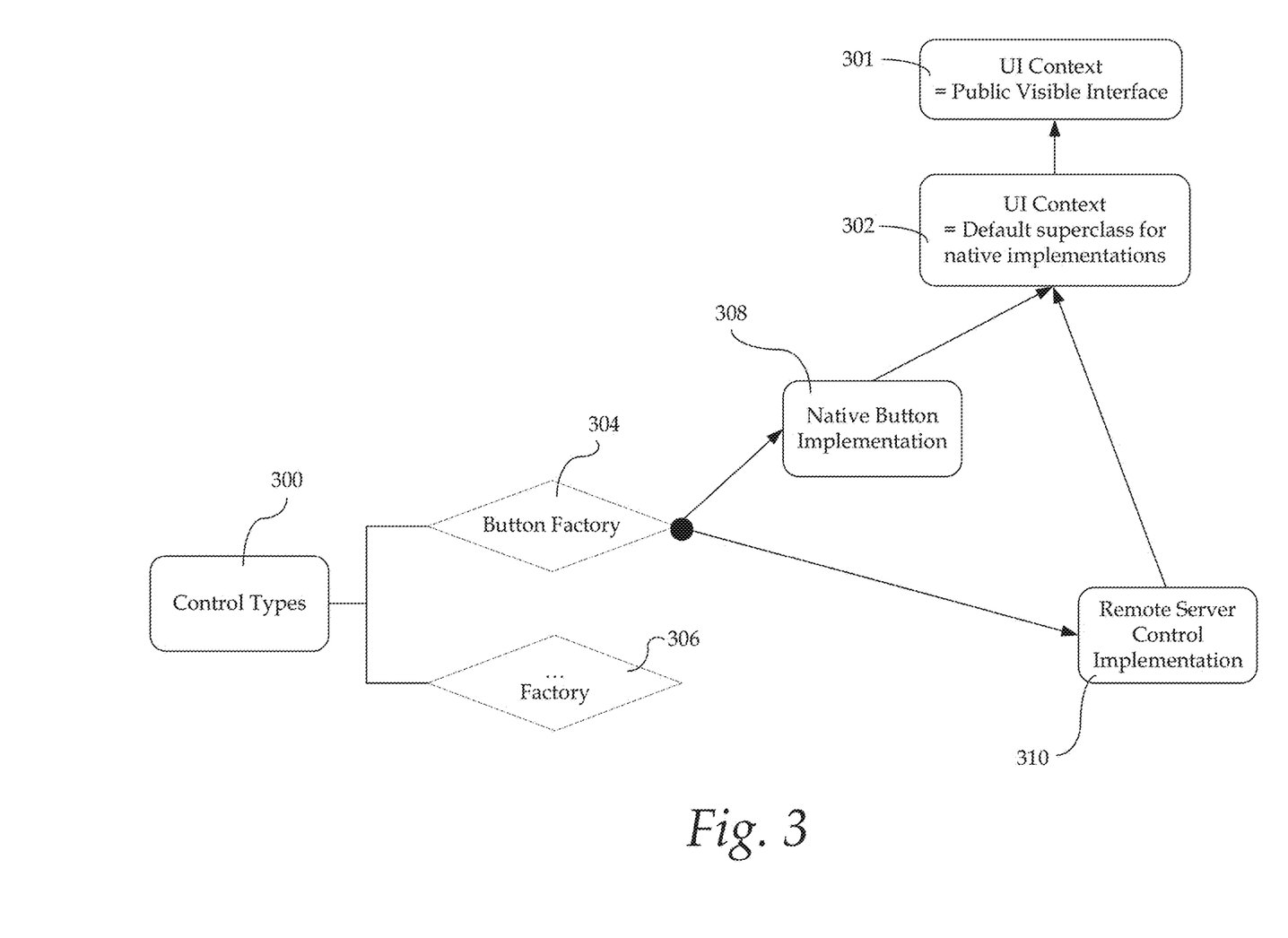
FIG. 3 shows the relationship between exemplary control type constants and user interface (UI) control implementations.

FIG. 3 shows the relationship between exemplary control type constants 300 and UI control implementations. The UI Context has a public visible interface 301 and a default superclass 302 for native control implementations. Default superclass 302 manages the initialization of the native UI element 308 and associated remote server control implementations 310. More particularly, default superclass 302 boots up the functionality of the underlying implementations (308 and 310). During this boot-up process, styles may be fetched from a central repository. The known parameters of the native control (e.g., name, type, etc.) may be provided in a selection statement, and the resulting styles are returned. Alternatively, the associated factory (304 or 306) may also retrieve the styles. For optimization reasons, the styles may be transferred to superclass 302, so no additional query need to be sent.

Returning to FIG. 2, at 216, UI module 127 attaches the native UI element with a central UI manager. The UI manager manages the current look and feel of the user interface, including the set of available native UI elements.

The UI manager may, for example, store the unique identifier of the UI element. Like UI controls, the UI manager may have transcompilable components (or reused code) and native components (or platform specific code).

At 218, UI module 127 returns the UI context with the native element to client system 131.

At 220, the native element is manipulated at the client system 131 via query statements based on the UI context. More particularly, such manipulation may be performed in a query-like manner using, for example, UI context methods. Multiple (and probably different) elements may be selected and same properties can be changed with a single statement. For example, the query statement "set ("select*with id='button*' set "enable"="false")" may select controls with identifier (id) starting with "button" and disable them. Since no specific type is given, other UI elements, such as a drop-down box, may also be selected if the id matches.

Accessing the UI element may be performed by various methods. In some implementations, the UI tree is recursively traversed until a matching criterion is satisfied or a predefined path (e.g., nameA/nameB/nameC) has been completed. In other implementations, the UI element may be remembered by the application which stores a pointer to the UI element and sets the value directly. In yet other implementations, the UI element may be queried by searching UI indexed lists. The third approach is very successful and fast in JAVASCRIPT, but typically not available in typed language platforms. This is because the set returned by a generic query has different types. Since a standardized UI context is used, every element has the same interface. The result set is also of type UI context, but with a different implementation. It works like a proxy, having a list with all found elements. Each method runs over all elements and executes the intended method, e.g., change the background color.

At 222, testing module 134 initiates a trace and replay of an application scenario involving the native UI element. The trace and replay may be initiated via a remote terminal provided at the server 101 to run and debug the application. Debugging may be performed via the master IDE 132 at client system 131, while showing the behavior using the target platform. As the creation of the UI tree is done with an indirection, the server 101 may register a remote UI control, instead of using native UI controls for all possible types. There is no need to provide multiple control implementations. A single UI control with only a single UI context interface may be provided to serve all types of platforms.

The remote terminal may include a server manager 128 and a server application 129. Server manager 128 knows when data should be sent back to the client system 131. Data is sent to the client system 131 when, for example, the server application 129 has finished all UI manipulations and is waiting for input. Every operation of the UI tree may be logged and sent to a queue for communicating to the client system 131. The operations in the queue are sent when the server application 129 is returning control to the server manager 128.

A roundtrip cycle is initiated by the client system 131 sending a first request for the root element to the server 101. In response to the request, the server application 129 starts to write UI deltas (i.e., new data or values), which are sent back to the testing module 134. The client system 131 waits for input, and when action-relevant input has been made (e.g., clicking a specific button), the client deltas (i.e., new data or values) are sent to the server application 129. The server application 129 continues with UI deltas. A problem may be presented when the server application 129 needs time to finish a job, but the UI should present in-between results. The client system 131 may request for results at predetermined intervals.

More particularly, in an asynchronous (non-blocking) environment, the server application 129 cannot always answer in real-time, since it is also waiting for a response from, for example, other machines. Hence, the response from the server application 129 has to indicate to the client system 131 to wait for further instructions. The server application 129 uses working tasks for background jobs. These working tasks are managed in a queue. If this queue is not empty, this can be used to prompt the server application 129 to send to the client system 131 a "wait" signal, which indicates that the client system 131 should ask, in predetermined intervals, the server application 129 whether further instructions will follow. A callback on the client system 131 will fill the UI working task queue, which will be returned when the client system 131 performs the periodic pull job.

Some UI changes, such as writing text in an input form, should not directly initiate a roundtrip that is typically very time consuming. In general, a normal event, such as pressing a button, triggers a remote event that executes on the server 101 the callback. For changes that do not trigger events, the client system 131 collects a list of manipulated elements. Before a roundtrip to the server 101 starts (e.g., because a button has been pressed), the client system 131 may run through all manipulated UI elements, and request an update message indicating any changed value (or status) associated with the elements. For example, an input field may be updated with a new value (e.g., text); a checkbox may have a changed status (e.g., checked to unchecked). This message is sent together with the changed event to the backend server controls. The changed event is then executed by the server application 129 before it is internally triggered.

In the end, server 101 and client system 131 both have copies of the UI tree. The server 101 may have instances of a unified transcompiled UI control implementation of a universal UI element, while the client system 131 may have instances of different native implementations that are created when it receives the operation list via the terminal protocol. The terminal protocol synchronizes the manipulations upon them. Native elements are subsequently built and destroyed during runtime.

The remote terminal can easily be used to record and replay an application scenario for testing the UI element. All requests and responses are written at the server side to be archived. To replay, testing module 134 reads the request, sends it to the server 101 and waits for a response. To ensure that the response matches exactly the traced response during replay, every Id generated at the server 101 has to be deterministic—in other words, random unique Ids are not allowed. A type specific counter may be used to generate the deterministic Id. A separate counter may be used for each type of control. The client response should match the server Ids. If the client response comes from a replay script, it can only match if the server is not using different (or random) Ids this time.

To help the developer find an error, the testing module 134 may render the UI, but not register for events. Instead, all events may be taken from the trace log. The trace log contains the requests from the client system 131 and the responses from the server 101 (e.g., sequence of delta operations on UI contexts). The requests may contain actions such as 'button pressed'. To debug a recorded session, one may want to watch what happens at the client system 131. The 'button pressed' event may be triggered by the client system 131, but it does not mean that this event should be enforced again in the client system 131. The event may be sent to the server 101 for processing. The visual appearance of the UI may be somewhat different during replay as compared to during recording. The advantage of such a tracing mechanism is that regression tests may be automatically recorded, thereby reducing the effort to create tests and increasing the testing quality.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A system comprising:
   a non-transitory memory device for storing a computer-readable program code; and
   a processor in communication with the memory device, the processor being operative with the computer-readable program code to:
   receive, from an integrated development environment in a client system, a trigger for creating a native user interface element for a target platform based on a user interface context, wherein the user interface context is a class that defines an environment for user interface elements,
   instantiate the native user interface element,
   initialize the native user interface element and an associated native control, wherein the native user interface element and the associated native control are initialized in an order dependent on the target platform,
   return, to the client system, the user interface context with the native user interface element;
   receive a query statement from the client system;
   select a plurality of user interface elements, including the native user interface element using the query statement; and
   change properties of a same type of the selected plurality of user interface elements using the query.

2. The system of claim 1, further comprising the client system that generates the trigger by using one or more functions within the user interface context.

3. The system of claim 1, further comprising the client system that generates the trigger by using one or more type constant attributes.

4. The system of claim 1 wherein the processor is operative with the computer-readable program code to instantiate the native user interface element via a factory.

5. The system of claim 1 wherein the processor is operative with the computer-readable program code to initialize the native user interface element by
   applying a unique identifier, and
   setting parameters of the native user interface element.

6. The system of claim 5 wherein the processor is operative with the computer-readable program code to set parameters of the native user interface element by providing default values of the parameters according to the target platform to implement central styling.

7. The system of claim 5 wherein the processor is operative with the computer-readable program code to generate the unique identifier by using a type specific counter to generate a deterministic identifier.

8. The system of claim 1 wherein the processor is operative with the computer-readable program code to attach the native user interface element with a user interface manager.

9. The system of claim 1, further comprising the client system that initiates manipulation of the native user interface element via one or more query statements, including the query statement.

10. The system of claim 1, further comprising the client system that initiates trace and replay of an application scenario involving the native user interface element.

11. The system of claim 10 wherein the processor is operative with the computer-readable program code to provide a remote terminal to trace and replay the application scenario.

12. A non-transitory computer-readable medium having stored thereon program code, the program code is executable by a computer to:
   receive, from an integrated development environment in a client system, a trigger for creating a native user interface element for a target platform based on a user interface context, wherein the user interface context is a class that defines an environment for user interface elements;
   instantiate the native user interface element;
   initialize the native user interface element and an associated native control, wherein the native user interface element and the associated native control are initialized in an order dependent on the target platform;
   return, to the client system, the user interface context with the native user interface element;
   receive a query statement from the client system;
   select a plurality of user interface elements, including the native user interface element using the query statement; and
   change properties of a same type of the selected plurality of user interface elements using the query.

13. A method of user interface development, comprising:
   receiving, from an integrated development environment in a client system, a trigger for creating a native user interface element for a target platform based on a user interface context, wherein the user interface context is a class that defines an environment for user interface elements;
   instantiating the native user interface element;
   initializing the native user interface element and an associated native control, wherein the native user interface element and the associated native control are initialized in an order dependent on the target platform;
   returning, to the client system, the user interface context with the native user interface element;
   receiving a query statement from the client system;
   selecting a plurality of user interface elements, including the native user interface element using the query statement; and
   changing properties of a same type of the selected plurality of user interface elements using the query.

14. The method of claim 13, wherein the instantiating the native user interface element comprises using a factory object.

15. The method of claim 13, wherein the initializing the native user interface element comprises:
   applying a unique identifier, and
   attaching the native user interface element to a parent element.

16. The method of claim 13, further comprising:
setting parameters of the native user interface element by providing default values of the parameters according to the target platform to implement central styling.

* * * * *